United States Patent
Rinne et al.

(10) Patent No.: US 6,863,209 B2
(45) Date of Patent: Mar. 8, 2005

(54) LOW TEMPERATURE METHODS OF BONDING COMPONENTS

(75) Inventors: Glenn A. Rinne, Apex, NC (US); Krishna K. Nair, Apex, NC (US)

(73) Assignee: Unitivie International Limited, Curacao (NL)

( * ) Notice: Subject to any disclaimer, the term of this patent is extended or adjusted under 35 U.S.C. 154(b) by 59 days.

(21) Appl. No.: 10/017,350

(22) Filed: Dec. 14, 2001

(65) Prior Publication Data

US 2002/0074381 A1 Jun. 20, 2002

Related U.S. Application Data

(60) Provisional application No. 60/256,072, filed on Dec. 15, 2000.

(51) Int. Cl.[7] .............................................. B23K 31/02
(52) U.S. Cl. ................ 228/194; 228/248.1; 228/234.1; 219/129
(58) Field of Search ................................ 228/193, 194, 228/245, 246, 248.1, 248.5, 234.1; 219/129

(56) References Cited

U.S. PATENT DOCUMENTS

| | | | | |
|---|---|---|---|---|
| 3,602,979 A | * | 9/1971 | La Iacona | 228/122.1 |
| 3,923,231 A | * | 12/1975 | Catalano et al. | 228/194 |
| 4,325,734 A | * | 4/1982 | Burrage et al. | 419/60 |
| 4,332,341 A | * | 6/1982 | Minetti | 228/180.22 |
| 4,614,296 A | * | 9/1986 | Lesgourgues | 228/194 |
| 4,640,438 A | * | 2/1987 | Trevison et al. | 220/359.5 |
| 5,009,360 A | | 4/1991 | Reisman et al. | |
| 5,025,304 A | | 6/1991 | Reisman et al. | |
| 5,392,982 A | * | 2/1995 | Li | 228/124.5 |
| 5,542,602 A | * | 8/1996 | Gaynes et al. | 228/175 |
| 5,621,607 A | * | 4/1997 | Farahmandi et al. | 361/502 |
| 5,812,925 A | * | 9/1998 | Ecer | 428/548 |
| 6,087,021 A | * | 7/2000 | Gaynes et al. | 428/546 |
| 6,121,576 A | * | 9/2000 | Hembree et al. | 219/209 |
| 6,187,450 B1 | * | 2/2001 | Budinger et al. | 428/546 |
| 6,199,751 B1 | * | 3/2001 | Gaynes et al. | 228/195 |
| 6,241,145 B1 | * | 6/2001 | Maeda et al. | 228/180.22 |
| 6,340,113 B1 | * | 1/2002 | Avery et al. | 228/248.5 |
| 6,520,401 B1 | * | 2/2003 | Miglietti | 228/194 |
| 2002/0074381 A1 | * | 6/2002 | Rinne et al. | |
| 2002/0157247 A1 | * | 10/2002 | Li | |

FOREIGN PATENT DOCUMENTS

JP                403234359 A    *  10/1991

OTHER PUBLICATIONS

US 2002/0157247A1 Li Oct. 31, 2002.*
US 2002/0074381A1 Rinne et al. Jun. 20, 2002.*
E.K. Yung et al; *Flip–Chip Process Utilizing Electroplated Solder Joints*; Proceedings of the Technical Conference, 1990 International Electronics Packaging Conference, Sep. 10–12, 1990 pp 1065–1079.

* cited by examiner

*Primary Examiner*—Kiley Stoner
(74) *Attorney, Agent, or Firm*—Myers Bigel Sibley & Sajovec (57) ABSTRACT

Methods of bonding two components may include positioning the components relative to one another to obtain a desired orientation. Once the desired orientation is obtained, the components can be bonded in the desired orientation with metal wherein a temperature of both components is maintained below a melting temperature of the metal while bonding. Related structures are also discussed.

55 Claims, 4 Drawing Sheets

LOW TEMPERATURE METHODS OF BONDING COMPONENTS

RELATED APPLICATIONS

The present application claims priority from U.S. Provisional Application No. 60/256,072 entitled "Room Temperature Bonding Methods For Prepositioned Components And/Or Fibers" filed Dec. 15, 2001. The disclosure of Provisional Application No. 60/256,072 is hereby incorporated herein in its entirety by reference.

BACKGROUND OF THE INVENTION

The present invention relates to methods of bonding components and more particularly to low temperature methods of bonding components and related structures.

It is known to bond components such as microelectronic devices to a substrate using solder reflow as discussed, for example, by E. Yung et al. in "Flip-Chip Process Utilizing Electroplated Solder Joints" (Proceedings of the Technical Conference, 1990 International Electronics Packaging Conference, Sep. 10–12, 1990, pp. 1065–1079). Flip-chip technology (also known as C4 technology) relies on gang bonding of bumped pads to a substrate with a matching footprint. SnPb solder of high lead content can be used as the bump material. The bonding mechanism is the wetting of pad metallurgy during thermal reflow of solders. The disclosure of the Yung et al. reference is hereby incorporated herein in its entirety by reference.

Reflowing solder, however, means that the solder is heated above its melting temperature, and one or both of the substrate and/or the component may also be heated above the melting temperature of the solder. In some applications, excessive heating of the substrate and/or component may not be desired. In addition, the reflow of solder may result in the outgassing or evolution of materials such as flux which may leave an undesirable residue on the component and/or substrate.

SUMMARY OF THE INVENTION

Methods of bonding components according to embodiments of the present invention may include positioning the components relative to one another to obtain a desired orientation, and bonding the components in the desired orientation with metal wherein a temperature of both components is maintained below a melting temperature of the metal while bonding. Damage to either component as a result of heating above a melting temperature may thus be reduced. In addition, outgassing and/or evolution of materials during bonding may be reduced. Moreover, misalignment resulting from thermal expansion under temperature can be reduced.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness and/or dimensions of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present. Also, when an element is referred to as being "bonded" to another element, it can be directly bonded to the other element or intervening elements may be present. In contrast, when an element is referred to as being "directly bonded" to another element, there are no intervening elements present.

According to embodiments of the present invention, two components can be bonded using a metal bond. More particularly, the two components can be positioned relative to one another to obtain a desired orientation, and the two components can be bonded in the desired orientation with the metal wherein a temperature of the components is maintained below a melting temperature of the metal while bonding. By way of example, the bonding metal can be plated on the components being bonded, or particles of the bonding metal can be provided on the two components and then bonded to each other and to the two components being bonded. While particular examples of bonding are discussed in greater detail below with respect to bonding an optical fiber to a substrate, metal bonding methods, structures, and apparatus according to the present invention can be applied to bonding substrates; optical components such as optical fibers, laser diodes, PIN diodes, vertical cavity surface emitting lasers, lenses, and/or gratings; micro-electronic components; and micro-mechanical components.

Figure 1:
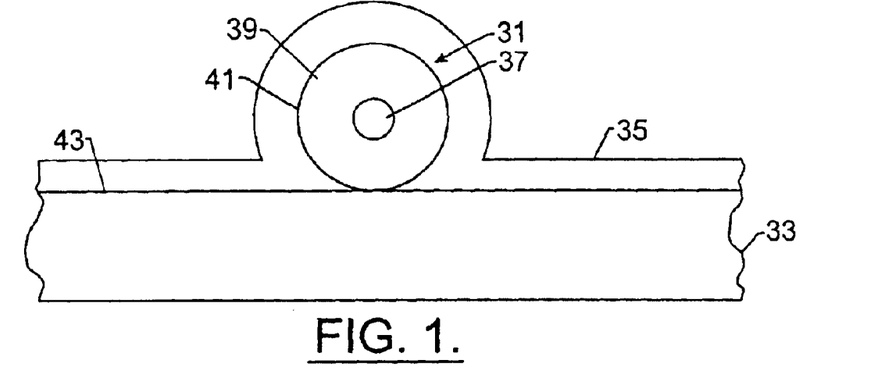
FIG. 1 is a cross-sectional view of a component bonded to a substrate using a metal layer according to embodiments of the present invention.

FIG. 1 illustrates an optical fiber 31 that is bonded to a substrate 33 using a layer 35 of a plated metal. As shown, the fiber 31 includes a core 37 and cladding 39. The optical fiber 31 can also include a metallized surface 41, and the substrate can include a metallized surface 43 to facilitate plating thereon. The optical fiber 31 with the metallized surface 41 can thus be positioned relative to the substrate 33 to obtain a desired orientation therebetween, and the optical fiber can be bonded to the substrate in the desired orientation by plating the metal layer 35 thereon while maintaining the optical fiber 31 in the desired orientation relative to the substrate. By plating the metal to bond the optical fiber to the substrate, bonding can be effected without significantly increasing the temperature of the substrate or optical fiber.

More particularly, the metal layer 35 can be plated using electroplating, electroless plating, electrophoretic plating, and/or any other plating techniques known to those having skill in the art. Moreover, the plating solution can be applied using selective plating of the substrate 33 and fiber 31 in a tank of the plating solution; using localized plating such as with a brush, a sponge, a pad, an open cell foam; and/or using any other application techniques known to those having skill in the art.

When using electroplating, a plating solution including the plating metal is applied to the metallized surfaces of the substrate and optical fiber, and an anode is provided in contact with the plating solution opposite the substrate. By applying an electrical potential between the anode and the metallized surfaces of the substrate and optical fiber, plating metal from the solution can be deposited on the metallized surfaces of the substrate and optical fiber.

When using electrophoretic plating, the plating solution includes dielectric particles in addition to the plating metal. Like electroplating, the plating solution is applied to the metallized surfaces of the substrate and the optical fiber, and an anode is provided in contact with the plating solution opposite the substrate. As with electroplating, plating metal from the solution can be deposited on the metallized surfaces of the substrate and the optical fiber by applying an electrical potential between the anode and the metallized surfaces. In electrophoretic plating, the dielectric particles in the plating solution can also be incorporated in the metal layer 35 to increase a deposition thickness and/or deposition rate of the metal layer. In other words, a desired thickness of the layer 35 can be obtained more quickly because of the dielectric particles incorporated therein. In addition, the use of glasses and/or oxides as the dielectric particles can decrease a creep rate and/or increase a stiffness of the plated metal layer.

When using electroless plating, there is no need for an anode or the application of an electrical potential. In this case, the surface 43 of the substrate and the surface 41 of the optical fiber are provided with a catalyst. As many metals may act as a catalyst for electroless plating, the surfaces of the substrate and optical fiber can be metallized as discussed above. Alternatively, any other suitable electroless plating catalyst can be used in place of or in addition to metallization. By providing an electroless plating solution on the substrate and fiber with the appropriate catalyst thereon, the metal layer 35 can be plated thereon.

Figure 2A:
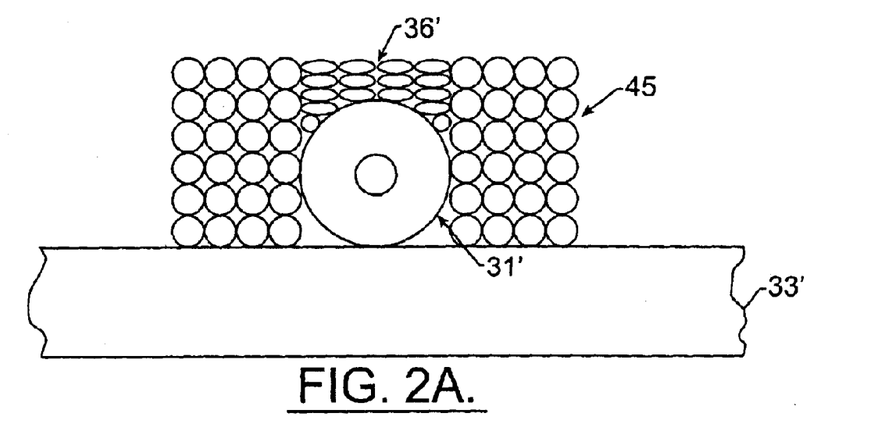
FIGS. 2A–B are cross-sectional views of intermediate steps of bonding a component and substrate using a metal layer according to embodiments of the present invention.
Figure 2B:
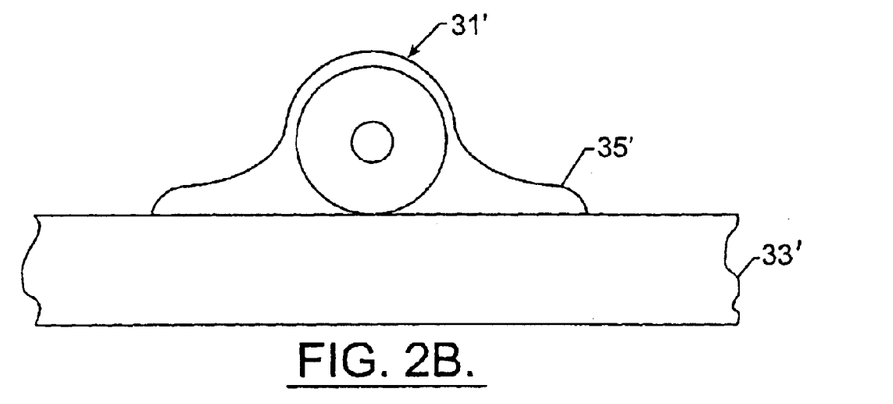

The metal layer 35 of FIG. 1, for example, may have a relatively uniform thickness by applying the plating solution in a tank. Other techniques of applying the plating solution, however, may result in different cross-sectional profiles of the metal layer. FIGS. 2A–B illustrate the application of plating solution to the substrate 33' and the optical fiber 31' using an open cell foam plating pad 45 and a resulting metal layer 35' having a fillet shaped profile. By pressing the open cell plating pad 45 against the optical fiber and the substrate surface as shown in FIG. 2A, the cells 36' on top of the optical fiber may be compressed thereby reducing mass transport of the plating solution to the top of the optical fiber. The plated metal layer 35' of FIG. 2B can thus have a fillet shape which may be desirable for some applications. The open cell foam plating pad 45 of FIG. 2A can thus be used to locally apply the plating solution.

Figure 3A:
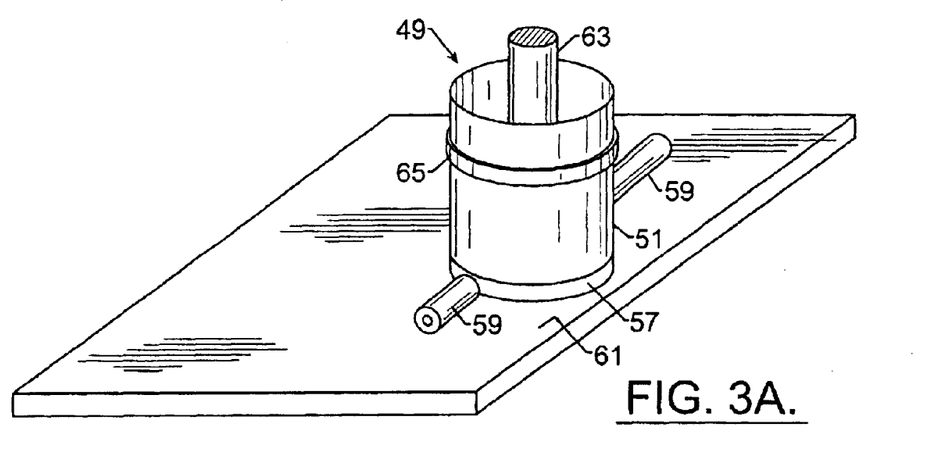
FIGS. 3A–D are perspective and cross-sectional views of an apparatus for bonding a component and a substrate according to embodiments of the present invention.
Figure 3B:
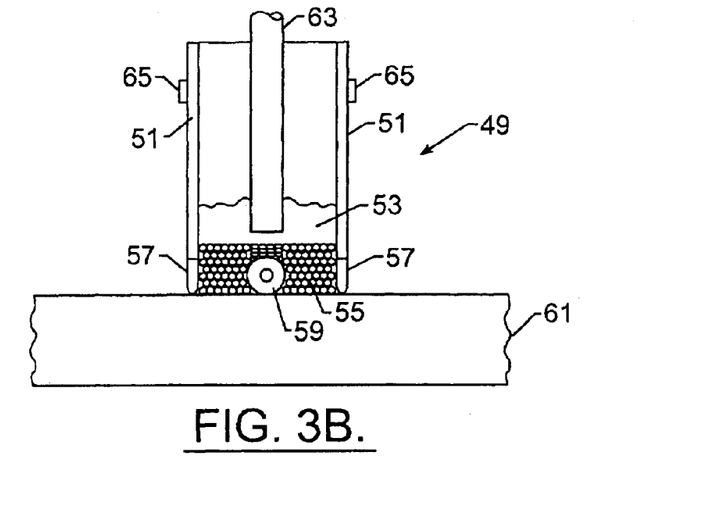

Embodiments of an apparatus 49 for locally applying plating solution to an optical fiber and substrate are illustrated in perspective and cross-sectional views of FIGS. 3A–B. As shown, a plating solution 53 can be confined within a dielectric tube 51 (such as a quartz tube) having an open cell foam pad 55 at one end thereof. The apparatus can also include a flexible O-ring 57 to facilitate a better fit with optical fiber 59 and substrate 61. In addition, the apparatus can include an anode 63 for electroplating and/or electrophoretic plating. An anode may not be required, however, for plating operations that do not require an application of an electrical potential such as electroless plating. As shown, the apparatus can also include a mounting ring 65 used to manipulate and position the tube 51.

More particularly, the open cell foam pad 55 and dielectric tube 51 can confine the plating solution 53 so that the plating solution does not spread across the substrate 61. The open cell foam pad, however, can allow passage of the plating solution to the optical fiber 59 and portions of the substrate with which it is in contact. The apparatus of FIGS. 3A–B can thus be used with electroplating solutions, electrophoretic plating solutions, and/or electroless plating solutions. With electroplating and/or electrophoretic plating solutions, an electrical potential can be applied between the anode and metallized surfaces of the substrate and optical fiber. With electroless plating solutions, the anode may not be required.

The optical fiber 59 can thus be positioned relative to the substrate 61 to obtain a desired orientation therebetween, and the optical fiber can be held in the desired orientation while the apparatus 49 is brought into contact with the optical fiber 59 and substrate 61. More particularly, an actuator can be coupled to the mounting ring 65, and the actuator can be used to position the apparatus on the optical fiber 59. The flexible O-ring 57 can provide a seal with respect to the optical fiber and the substrate to reduce undesired spreading of plating solution across the substrate 61 surface. While the O-ring is illustrated in FIGS. 3A–B, the O-ring is not required. The tube 51, for example, may include notches therein to allow passage of the fiber therethrough, and/or open cell foam may extend below the opening of the tube.

Figure 3C:
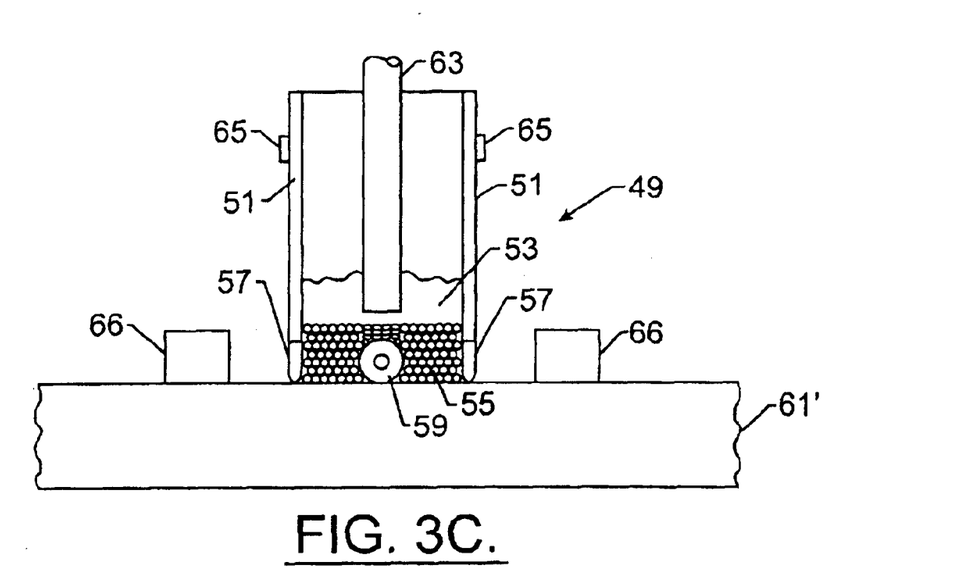
Figure 3D:
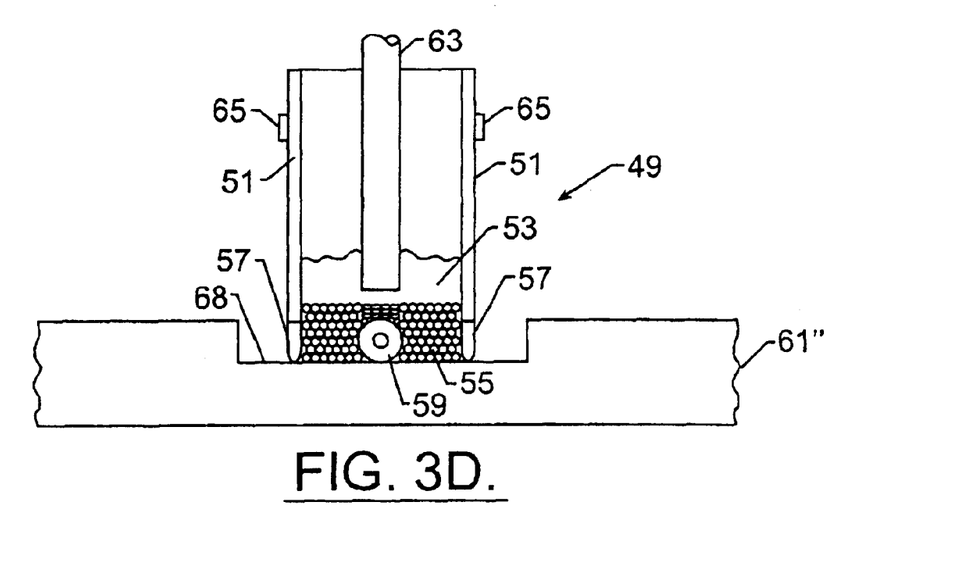

Alternatively, or in addition, a well may be provided in the substrate and/or a dam may be provided on the substrate to reduce undesired spreading of the plating solution. As shown in FIG. 3C, dam(s) 66 on substrate 61' may be used to reduce undesired spreading of the plating solution 53 across the surface of the substrate 61'. As shown in FIG. 3D, a well 68 (also referred to as a trench) in the substrate 61" may be used to reduce undesired spreading of the plating solution 53 across the surface of the substrate 61". The apparatus 49 illustrated in FIGS. 3C and 3D can be the same as that illustrated in FIG. 3B. Moreover, the dam(s) 66 of FIG. 3C can be provided by forming a patterned layer on the substrate, and the well 68 of FIG. 3D can be provided by etching the substrate.

Once the apparatus 49 is brought into contact with the optical fiber and substrate, plating can begin. More particularly, plating solution 53 can feed through the open cell foam pad 55 to the optical fiber and the substrate 61. While an open cell foam pad is discussed by way of example, other porous materials could be used in place of open cell foam. With electroplating and/or electrophoretic plating, an electrical potential can be applied between the anode 63 and metallized surfaces of the substrate 61 and the optical fiber 59 to effect plating. With electroless plating, the anode may not be required.

Once a desired thickness of metal has been plated, the apparatus 49 can be removed from the optical fiber and substrate, and the plated metal layer can bond the optical fiber to the substrate in the desired orientation. More particularly, a plated metal layer such as that illustrated in FIG. 2B can bond the fiber and substrate. Because the optical fiber is now bonded with the plated metal layer, the fiber and/or substrate can be released from any equipment used for positioning during plating operations. The plated metal can be any metal suitable for plating such as, for example, nickel, lead, tin, silver, gold, and/or alloys thereof. The optical fiber can thus be bonded to a substrate using a metal layer while maintaining temperatures of the optical fiber and substrate below a melting temperature of the metal.

Figure 4:
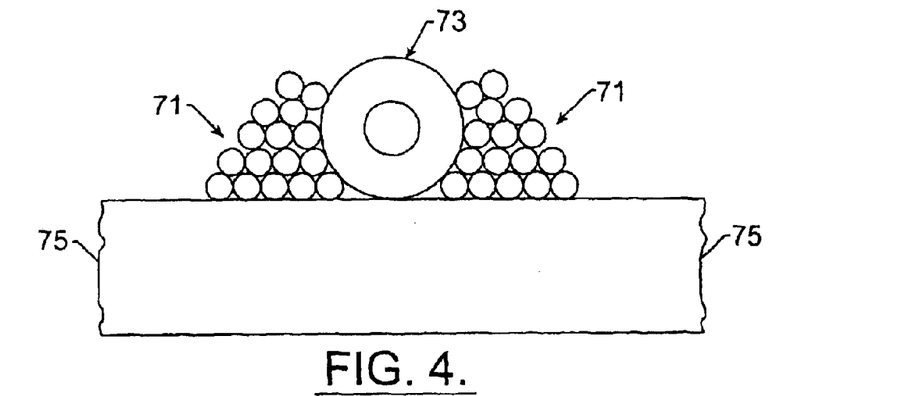
FIGS. 4–6 are cross-sectional views illustrating a component bonded to a substrate using metal particles according to embodiments of the present invention.

According to additional embodiments of the present invention, components can be bonded by providing particles of a metal adjacent the components and bonding the metal particles. As shown in FIG. 4, a plurality of metal particles 71 can be provided adjacent the optical fiber 73 and the substrate 75, and the metal particles 71 can be bonded while temperatures of the optical fiber 73 and the substrate 75 are maintained below a melting temperature of the metal of the metal particles. The metal particles 71 may be in the form of a metal powder, for example, or the metal particles may include a dielectric material (such as a glass sphere) coated with metal. In addition, bonding surfaces of the substrate and optical fiber may be metallized and/or provided with a catalyst to facilitate bonding with the metal particles.

The metal particles can be provided adjacent to the optical fiber and substrate prior to positioning the optical fiber, and then bonded after positioning the optical fiber. Alternatively, the optical fiber can be positioned relative to the substrate, and then the metal particles can be provided adjacent the optical fiber and substrate and bonded. While the optical fiber and metal particles are shown on a relatively flat substrate in FIG. 4, a well can be provided in the substrate, or a dam can be provided on the substrate to reduce spreading of the metal particles. In addition, the metal particles can be provided on the optical fiber opposite the substrate and/or between the fiber and the substrate.

Figure 5:
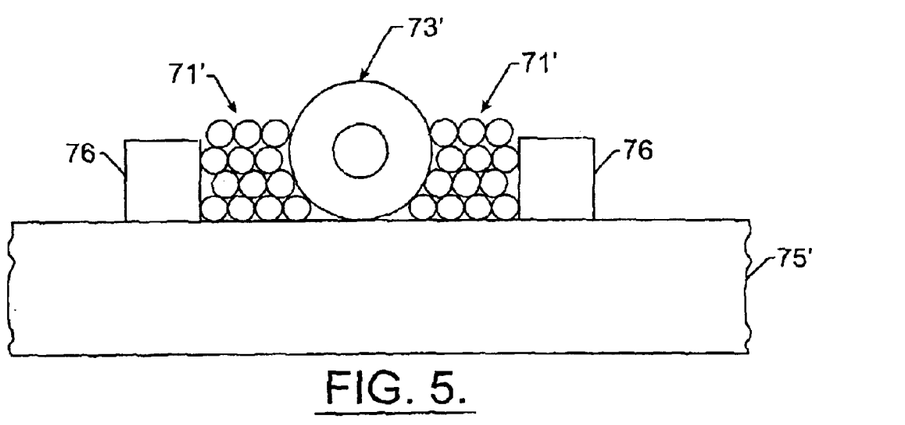
Figure 6:
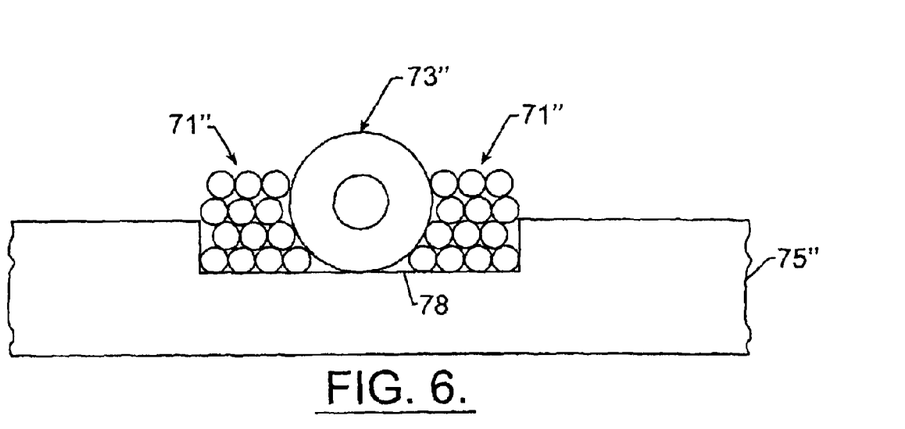

As shown in FIG. 5, the substrate 75' can have dam(s) 76 thereon to reduce spreading of the metal particles 71' across the surface of the substrate surface prior to bonding the metal particles 71' and the optical fiber 73' to the substrate 75'. As shown in FIG. 6, the substrate 75" can have a well 78 therein to reduce spreading of the metal particles 71" across the surface of the substrate surface prior to bonding the metal particles 71" and the optical fiber 73" to the substrate 75". The bonding of particles 71' and 71" of FIGS. 5 and 6 is the same as that described with respect to the bonding of particles 71 of FIG. 4. Moreover, the dam(s) 76 of FIG. 5 can be provided by forming a patterned layer on the substrate, and the well 78 of FIG. 6 can be provided by etching the substrate.

The metal particles 71 can be bonded using plating techniques similar to those discussed above with respect to FIGS. 1, 2A–B, and 3A–B. In particular, an electroplating, electrophoretic plating, and/or an electroless plating solution can be applied to the metal particles 71 and an electrical potential applied thereto (if needed) to bond the metal particles to each other and to surfaces of the optical fiber 73 and to the substrate 75. An apparatus similar to that of FIGS. 3A–B can be used to provide the plating solution and electrical potential (if needed).

According to alternative embodiments of the present invention, the metal particles 71 may be bonded by allowing diffusion between the metal particles. More particularly, the metal particles may comprise a metal having a relatively high diffusion rate at relatively low or ambient temperatures, such as indium. Accordingly, mere placement of the metal particles adjacent the substrate and optical fiber can result in bonding therebetween as the interfaces between metal particles 71 bond as a result of diffusion while maintaining the metal particles, optical fiber, and substrate below a melting temperature of the metal particles.

When using diffusion to bond the metal particles, it may be desirable to provide a diffusion barrier on the metal particles to reduce bonding during storage and to reduce bonding until the optical fiber has been positioned. A dielectric coating (such as an oxide), for example, may be provided on the metal particles to reduce diffusion until diffusion and bonding are desired. Accordingly, the metal particles can be stored and applied to the substrate without bonding, and then bonding can be effected by rupturing the dielectric coating. The dielectric coatings of the metal particles can be ruptured, for example, by applying an electrical potential thereto. Exposed portions of the metal in the metal particles can then bond as a result of diffusion.

A diffusion barrier may also be provided on the metal particles by providing a first metal with a first diffusion rate and by providing a coating of a second metal with a second diffusion rate on the first metal wherein the second diffusion rate is lower than the first diffusion rate. Accordingly, bonding of particles can be reduced until the coating of the second metal is diffused into the first metal. For example, the first metal may comprise indium, and the second metal may comprise copper. Accordingly, copper coated indium particles can be stored at a low temperature to maintain the copper diffusion barrier, and when applied at room temperature, the copper coating will diffuse into the indium particle so that indium from different particles can diffuse across interfaces therebetween to provide bonding. Alternatively, titanium, chromium, nickel, iridium, copper, and/or alloys thereof can be used to provide diffusion barriers on indium particles. A metal diffusion barrier can be provided on indium particles, for example, by vacuum deposition, chemical vapor deposition, or displacement reaction.

In addition, a diffusion barrier may be provided by a coating of a solid material that sublimes at room temperature. For example, indium particles can be coated with naphthalene or carbon dioxide and stored at a temperature sufficient to maintain the diffusion barrier in the solid state. Once the indium particles have been dispensed at room temperature, the diffusion barrier will sublime thereby allowing diffusion and bonding between indium particles.

Diffusion between metal particles can also be inhibited by vibrating the metal particles until bonding is desired. The metal particles, for example, can be maintained in a vibrating dispenser, and vibration (such as ultrasonic vibration) can be used to inhibit bonding of the metal particles. Once the metal particles are dispensed on a stationary substrate and optical fiber, diffusion and bonding can occur. Alternatively, the metal particles can be dispensed on the optical fiber and substrate which are vibrated until a desired orientation is achieved, and the vibration is ceased to allow diffusion and bonding.

Alternatively, diffusion between metal particles can be inhibited by providing the metal particles in a foam such as a cellulose foam. As long as the foam is maintained, many of the particles will be separated. Accordingly, the metal particles can be stored and dispensed as a foam, and the foam can be applied to the optical fiber and substrate without initiating bonding. Once the desired position of the optical fiber is achieved, diffusion and bonding can be initiated by collapsing the foam so that the metal particles come into contact and diffusion and bonding occur. The foam can be collapsed, for example, by adding a detergent and/or by introducing an atmosphere (such as nitrogen) that increases a surface tension of the foam.

By using metal particles having a high diffusion rate, bonding can be achieved at room temperature without generating excessive residues that might degrade a light path. Accordingly, post bonding cleaning may be reduced. In addition, bonding can be achieved relatively quickly. The use of diffusion to bond metal particles can also be referred to as cold welding. Moreover, the speed of diffusion and thus bonding can be increased by providing a flow of electrons through the metal particles, and/or by increasing a temperature of the metal particles to a temperature less than a melting temperature of the metal particles. By providing a flow of electrons through the metal particles, movements of metal atoms can be accelerated as a result of pressure due to electron flux, also referred to as electromigration. Cold welding can also be accelerated by applying pressure to the metal particles.

The metal particles can also be bonded by applying sufficient current through the metal particles so that metal particles are welded at interfaces therebetween. Here the increased welding temperature may be localized to interfaces between metal particles where current densities are the highest without significantly heating the bulk of the metal particles so that temperatures of the optical fiber and/or the substrate are maintained below the melting temperature of the metal. Bonding interfaces of metal particles using an electrical current to effect a weld may be done quickly without significantly increasing temperatures of the substrate and optical fiber. Moreover, the metal particles to be welded can comprise metal(s) having a relatively low creep rate and having relatively high stiffness so that a relatively rigid bond can be provided. Moreover, a metal bond may be effected without generating significant residues and/or particles. The bonding current, for example, could be generated using an arc discharge from a capacitor.

The metal particles used for bonding can alternatively comprise a metal that amalgamates with a liquid species at a temperature less than the melting temperature of the metal. The metal particles, for example, can be silver and/or gallium particles that amalgamate with mercury to generate an alloy thereof and to bond the particles. Accordingly, metal particles can be provided on the optical fiber and substrate either before or after positioning, and once the desired position is achieved, the liquid species can be introduced to the metal particles to effect alloying and bonding. The liquid species can be applied, for example, through a brush, a sponge, a pad, an open cell foam, or using any other application techniques known to those having skill in the art. Moreover, an apparatus similar to that illustrated in FIGS. 3A–B could be used to apply the liquid species.

According to additional embodiments of the present invention, corrosion may be used to bond metal particles. By facilitating corrosion of a mass of metal particles, interfaces of adjacent metal particles may bond as the respective layers of corrosion on different particles grow and merge. The corrosion, for example, can be the result of oxidation or galvanic corrosion.

As an example of bonding using oxidation, the metal particles may comprise iron. Once a desired position of the optical fiber has been achieved, iron particles adjacent the optical fiber and substrate can be exposed to moisture to facilitate oxidation of the iron particles. The oxide (rust) of adjacent iron particles can grow such that the respective rust layers merge to bond the adjacent particles. Bonding using oxidation can thus be effected without generating significant residues and without significantly increasing temperatures of the substrate or optical fiber.

Alternatively, galvanic corrosion can be used to effect bonding of adjacent particles. For example, the metal particles can include a mixture of particles of dissimilar metals such as aluminum and steel or aluminum and zinc. Galvanic corrosion and bonding of the particles can be initiated by introducing moisture to the particles so that substitution of the dissimilar metals (otherwise referred to as galvanic corrosion) results in bonding of the metal particles. Prior to bonding, bonding can be inhibited by maintaining the particles of dissimilar metals separate and/or dry.

Alternatively, bonding can be provided by a displacement reaction implemented using particles of a first metal and then applying a solution of a second more noble metal. For example, a solution of zinc can be applied to aluminum particles to cause galvanic corrosion of the aluminum particles. Since aluminum is trivalent and zinc is divalent, there is an increase in particle volume, further increasing an intimacy of contact between the particles, component, and substrate. In other words, zinc atoms will be substituted for aluminum atoms at the surface of the aluminum particles, and because three zinc atoms will be substituted for every two aluminum atoms replaced, the aluminum particles will grow as a result of the galvanic corrosion (also referred to as a substitution reaction). Accordingly, the aluminum particles can bond at interfaces therebetween as zinc is substituted for aluminum. Moreover, the solution of the dissimilar metal can be applied through a brush, a sponge, a pad, an open cell foam, or using any other application techniques known to those having skill in the art. Displacement reactions can thus be used to bond metal particles without significantly increasing temperatures of the optical fiber or substrate and without generating significant residues. Surfaces of the component and/or substrate may also be metallized with aluminum to further facilitate bonding.

The various techniques discussed above can thus be used to provide metal bonding between two components while maintaining the two components below a melting temperature of the bonding metal. While bonding of an optical fiber to a substrate is discussed by way of example, methods, structures, and apparatus according to embodiments of the present invention can be applied to the bonding of substrates, optical components, micro-electronic components, and/or micro-mechanical components. Moreover, the particular metals and/or solutions discussed for providing bonding are discussed by way of example only without limiting the present invention to the particular examples discussed.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of bonding two components, the method comprising:
    positioning the components relative to one another to obtain a desired orientation; and
    bonding the two components in the desired orientation with metal wherein a temperature of both components is maintained below a melting temperature of the metal while bonding;
    wherein a first one of the components comprises a substrate and wherein a second one of the components comprises an optical component.

2. A method according to claim 1 wherein bonding comprises plating the metal on the two positioned components.

3. A method according to claim 1 wherein bonding comprises electroplating the metal on the two components.

4. A method according to claim 1 wherein bonding comprises electroless plating the metal on the two components.

5. A method according to claim 1 wherein bonding comprises providing an electrophoretic coating on the two components wherein the electrophoretic coating comprises the metal and dielectric particles.

6. A method of bonding two components, the method comprising:
   positioning the components relative to one another to obtain a desired orientation; and
   bonding the two components in the desired orientation with metal wherein a temperature of both components is maintained below a melting temperature of the metal while bonding;
   wherein a first one of the components comprises a substrate and wherein a second one of the components comprises one of a micro-electronic component, an optical component, or a micro-mechanical component; and
   wherein bonding comprises providing particles of the metal on the two components and bonding the metal particles.

7. A method according to claim 6 wherein each of the particles of the metal comprises a dielectric material coated with the metal.

8. A method according to claim 6 wherein bonding the metal particles comprises allowing diffusion between the metal particles.

9. A method of bonding two components, the method comprising:
   positioning the components relative to one another to obtain a desired orientation; and
   bonding the two components in the desired orientation with metal wherein a temperature of both components is maintained below a melting temperature of the metal while bonding;
   wherein bonding comprises providing particles of the metal on the two components and bonding the metal particles;
   wherein bonding the metal particles comprises allowing diffusion between the metal particles; and
   wherein the metal comprises a metal having a diffusion rate at room temperature as high as a diffusion rate of Indium at room temperature.

10. A method according to claim 9 wherein the metal comprises Indium.

11. A method according to claim 8 wherein providing the particles of the metal comprises providing the particles of the metal with a dielectric coating thereon and wherein bonding the metal particles is preceded by rupturing the dielectric coatings.

12. A method of bonding two components, the method comprising:
   positioning the components relative to one another to obtain a desired orientation; and
   bonding the two components in the desired orientation with metal wherein a temperature of both components is maintained below a melting temperature of the metal while bonding;
   wherein bonding comprises providing particles of the metal on the two components and bonding the metal particles;
   wherein bonding the metal particles comprises allowing diffusion between the metal particles;
   wherein providing the particles of the metal comprises providing the particles of the metal with a dielectric coating thereon and wherein bonding the metal particles is preceded by rupturing the dielectric coatings; and
   wherein rupturing the dielectric coatings comprises passing an electric current through the particles.

13. A method of bonding two components, the method comprising:
   positioning the components relative to one another to obtain a desired orientation; and
   bonding the two components in the desired orientation with metal wherein a temperature of both components is maintained below a melting temperature of the metal while bonding;
   wherein bonding comprises providing particles of the metal on the two components and bonding the metal particles;
   wherein bonding the metal particles comprises allowing diffusion between the metal particles; and
   wherein the metal comprises a first metal with a first rate of diffusion and wherein the particles comprise a coating of a second metal with a second rate of diffusion wherein the second rate of diffusion is lower than the first rate of diffusion.

14. A method according to claim 13 wherein the first metal comprises Indium and the second material comprises Copper.

15. A method of bonding two components, the method comprising:
   positioning the components relative to one another to obtain a desired orientation; and
   bonding the two components in the desired orientation with metal wherein a temperature of both components is maintained below a melting temperature of the metal while bonding;
   wherein bonding comprises providing particles of the metal on the two components and bonding the metal particles;
   wherein bonding the metal particles comprises allowing diffusion between the metal particles; and
   wherein providing the particles of the metal comprises providing the particles of the metal with a coating of a solid material that sublimes at a bonding temperature less than the melting temperature of the metal.

16. A method according to claim 15 wherein the solid material comprises one of naphthalene or carbon dioxide.

17. A method according to claim 8 wherein providing the particles of the metal comprises providing the particles of the metal with a diffusion barrier thereon and wherein bonding the metal particles is preceded by rupturing the diffusion barrier.

18. A method according to claim 6 wherein providing the particles of the metal comprises vibrating the metal particles apart from the components, and after positioning the components, applying the metal particles to the components.

19. A method according to claim 6 wherein bonding the metal particles comprises passing an electrical current through the metal particles sufficient to weld interfaces thereof.

20. A method according to claim 6 wherein providing the particles comprises providing the particles in a foam and wherein bonding the metal particles comprises collapsing the foam.

21. A method according to claim 6 wherein bonding the metal particles comprises introducing a liquid species that amalgamates with the particles at a bonding temperature less than the melting temperature of the metal.

22. A method according to claim 21 wherein the metal comprises silver and the liquid species comprises mercury.

23. A method according to claim 6 wherein bonding the metal particles comprises corroding the metal particles.

24. A method according to claim 23 wherein corroding the metal particles comprises oxidizing the metal particles.

25. A method according to claim 24 wherein corroding the metal particles comprises galvanically corroding the metal particles.

26. A method according to claim 6 wherein bonding the metal particles comprises applying pressure to the metal particles.

27. A method according to claim 6 wherein bonding the metal particles comprises plating a metal thereon.

28. A method according to claim 6 wherein bonding the metal particles comprises providing a solution of a second metal on the metal particles to initiate a displacement reaction.

29. A method according to claim 1 wherein positioning the components is preceded by:
    providing particles of a metal on at least one of the components and vibrating the particles;
    wherein positioning the components comprises positioning the components while vibrating the particles; and
    wherein bonding the two components comprises ceasing vibrating the particles.

30. A method according to claim 1 wherein a temperature of the metal is maintained below a melting temperature of the metal while bonding.

31. A method according to claim 9 wherein a first one of the components comprises a substrate.

32. A method according to claim 31 wherein a second one of the components comprises one of a micro-electronic component, an optical component, or a micro-mechanical component.

33. A method according to claim 31 wherein the second one of the components comprises an optical component.

34. A method according to claim 33 wherein the optical component comprises an optical fiber.

35. A method according to claim 31 wherein the substrate comprises a dam thereon or a well therein.

36. A method according to claim 12 wherein a first one of the components comprises a substrate.

37. A method according to claim 36 wherein a second one of the components comprises one of a micro-electronic component, an optical component, or a micro-mechanical component.

38. A method according to claim 36 wherein the second one of the components comprises an optical component.

39. A method according to claim 38 wherein the optical component comprises an optical fiber.

40. A method according to claim 36 wherein the substrate comprises a dam thereon or a well therein.

41. A method according to claim 13 wherein a first one of the components comprises a substrate.

42. A method according to claim 41 wherein a second one of the components comprises one of a micro-electronic component, an optical component, or a micro-mechanical component.

43. A method according to claim 41 wherein the second one of the components comprises an optical component.

44. A method according to claim 43 wherein the optical component comprises an optical fiber.

45. A method according to claim 41 wherein the substrate comprises a dam thereon or a well therein.

46. A method according to claim 15 wherein a first one of the components comprises a substrate.

47. A method according to claim 46 wherein a second one of the components comprises one of a micro-electronic component, an optical component, or a micro-mechanical component.

48. A method according to claim 46 wherein the second one of the components comprises an optical component.

49. A method according to claim 48 wherein the optical component comprises an optical fiber.

50. A method according to claim 46 wherein the substrate comprises a dam thereon or a well therein.

51. A method according to claim 1 wherein the optical component comprises an optical fiber.

52. A method of bonding two components, the method comprising:
    positioning the components relative to one another to obtain a desired orientation; and
    bonding the two components in the desired orientation with metal wherein a temperature of both components is maintained below a melting temperature of the metal while bonding, wherein bonding comprises,
        providing particles of the metal on the two components wherein the metal has a diffusion rate at room temperature high as a diffusion rate of Indium at room temperature, and
        allowing diffusion between the metal particles.

53. A method of bonding two components, the method comprising:
    positioning the components relative to one another to obtain a desired orientation; and
    bonding the two components in the desired orientation with metal wherein a temperature of both components is maintained below a melting temperature of the metal while bonding, wherein bonding comprises,
        providing particles of the metal on the two components wherein the particles of the metal have dielectric coatings thereon,
        rupturing the dielectric coatings by passing an electric current through the particles,
        allowing diffusion between the metal particles.

54. A method of bonding two components, the method comprising:
    positioning the components relative to one another to obtain a desired orientation; and
    bonding the two components in the desired orientation with metal wherein a temperature of both components is maintained below a melting temperature of the metal while bonding, wherein bonding comprises,
        providing particles of the metal on the two components wherein the metal comprises a first metal with a first rate of diffusion and wherein the particles comprise a coating of a second metal with a second rate of diffusion wherein the second rate of diffusion is lower than the first rate of diffusion, and
        allowing diffusion between the metal particles.

55. A method of bonding two components, the method comprising:
    positioning the components relative to one another to obtain a desired orientation; and
    bonding the two components in the desired orientation with metal wherein a temperature of both components is maintained below a melting temperature of the metal while bonding, wherein bonding comprises,
        providing particles of the metal on the two components wherein the particles of the metal comprise a coating of a solid material that sublimes at a bonding temperature less than the melting temperature of the metal, and
        allowing diffusion between the metal particles.

* * * * *